(12) United States Patent
Machida et al.

(10) Patent No.: US 6,711,982 B2
(45) Date of Patent: Mar. 30, 2004

(54) BRAKE BOOSTER

(75) Inventors: Masakazu Machida, Saitama-ken (JP); Yasushi Mori, Saitama-ken (JP)

(73) Assignee: Bosch Braking Systems Co., Ltd., Tokyo (JP)

(*) Notice: Subject to any disclaimer, the term of this patent is extended or adjusted under 35 U.S.C. 154(b) by 0 days.

(21) Appl. No.: 10/078,653

(22) Filed: Feb. 19, 2002

(65) Prior Publication Data

US 2002/0129697 A1 Sep. 19, 2002

(30) Foreign Application Priority Data

Mar. 15, 2001 (JP) ........................................ 2001-074406
Aug. 9, 2001 (JP) ........................................ 2001-242522

(51) Int. Cl.$^7$ ................................................. F15B 9/10
(52) U.S. Cl. ..................................... 91/369.3; 91/376 R
(58) Field of Search .......................... 91/369.2, 369.3, 91/376 R

(56) References Cited

U.S. PATENT DOCUMENTS 6,397,723 B1 * 6/2002 Suwa ........................ 91/369.2

FOREIGN PATENT DOCUMENTS

| JP | 10-035474 | 2/1998 |
| JP | 11-115734 | 4/1999 |

* cited by examiner

*Primary Examiner*—Edward K. Look
*Assistant Examiner*—Michael Leslie
(74) *Attorney, Agent, or Firm*—Flynn, Thiel, Boutell & Tanis, P.C.

(57) ABSTRACT

An improvement of a valve plunger 14 used in a brake booster 1. A valve plunger 14 is made up of a rearwardly disposed body 34, and an engaging member 35 mounted on a front portion of the body 34. When a brake pedal is quickly depressed during an emergency brake operation, the engaging member 35 retracts rearward relative to the body 34, whereby the axial size of the entire valve plunger 14 is reduced, thereby increasing the opening of an atmosphere valve during the emergency brake operation as compared with a normal brake operation, allowing an output of an increased magnitude to be rapidly obtained. Thus, the invention allows an output from the brake booster 1 to be rapidly increased in immediate response to a quick depression of a brake pedal.

6 Claims, 12 Drawing Sheets

DURING NORMAL BRAKE OPERATION

SEQUENTIAL PHASES DURING EMERGENCY BRAKE OPERATION

Fig.11 DURING NORMAL BRAKE OPERATION

Fig.12 SEQUENTIAL PHASES DURING EMERGENCY BRAKE OPERATION

BRAKE BOOSTER

FIELD OF THE INVENTION

The invention relates to a brake booster, and more particularly, to a brake booster which assures that an increased output can be obtained reliably in response to a force of depression of a small magnitude which is applied to a brake pedal in the event a braking effort of an increased magnitude is required as in an emergency braking operation.

DESCRIPTION OF THE PRIOR ART

A brake booster which is arranged to permit an increased output to be obtained even in response to a braking depressing force of a small magnitude as in an emergency braking operation which requires a braking effort of an increased magnitude is known in the art, as exemplified by Japanese Patent No. 3,070,672 disclosing a brake booster in which in response to an input which exceeds a given value, an output gradient is increased subsequently to increase the output, or Japanese Laid-Open Patent Application No. 35,474/1998 disclosing a brake booster in which an operation of a brake pedal is electrically detected, and the output is increased in response thereto.

However, drawbacks are pointed out with conventional brake boosters as mentioned above. Specifically, in the brake booster disclosed in Patent No. 3,070,672, the arrangement is such that the output can be increased only after the input exceeds a given value, and accordingly, the output cannot be increased in immediate response to the quick depression of the brake pedal. On the other hand, in Application No. 35,474/1998, there is a need to provide a solenoid operated valve and a sensor which detects the degree of depression of the brake pedal in an integral manner with the booster, resulting in a complicated arrangement and an increased manufacturing cost of the brake booster.

SUMMARY OF THE INVENTION

In view of the foregoing, it is an object of the present invention to provide a brake booster which is simple in construction and which is capable of immediately increasing the output in response to a quick depression of a brake pedal.

Specifically, the present invention relates to a brake booster including a valve body slidably disposed within a shell, a power piston mounted on the valve body, a constant pressure chamber disposed forwardly of the power piston within the shell, a variable pressure chamber disposed rearwardly of the power piston within the shell, and a valve mechanism disposed within the valve body for switchably controlling a supply/discharge of a fluid to and from the variable pressure chamber, the valve mechanism comprising a vacuum valve seat formed on the valve body, a valve plunger connected to an input shaft and disposed within the valve body so as to be axially movable and having an atmosphere valve seat formed on a rear portion thereof, and a valve element including a first seat area which is adapted to be seated on the vacuum valve seat and a second seat area which is adapted to be seated on the atmosphere valve seat. According to the present invention, the brake booster further comprises length adjusting means which reduces the axial size of the entire valve plunger when the input shaft has advanced through a given stroke relative to the valve body.

With this arrangement, it is assured that when the brake pedal is quickly depressed during an emergency braking operation, the input shaft can be advanced through a given stroke or more relative to the valve body from its inoperative position. As a consequence, the length adjusting means reduces the axial size of the entire valve plunger, whereby an atmosphere valve which is formed by the atmosphere valve seat formed on the valve plunger and the second seat area of the valve element is opened to a greater degree than during a normal operation, thus allowing the atmosphere to be rapidly introduced into the variable pressure chamber to allow a rapid rise in the output from the brake booster. Under the balanced condition where both the atmosphere valve and the vacuum valve are closed, a clearance between a reaction disc and the valve plunger increases by an amount corresponding to the reduction in the axial size of the entire valve plunger which is caused by the length adjusting means, and the reaction disc bulges to a greater amount to increase the output in a corresponding manner.

Accordingly, there can be provided a brake booster which is simple in construction and which is capable of immediately increasing the output in response to a quick depression of the brake pedal.

Above and other objects, features and advantages of the invention will become apparent from the following detailed description of several embodiments thereof with reference to the drawings.

DETAILED DESCRIPTION OF THE EMBODIMENTS

Figure 1:
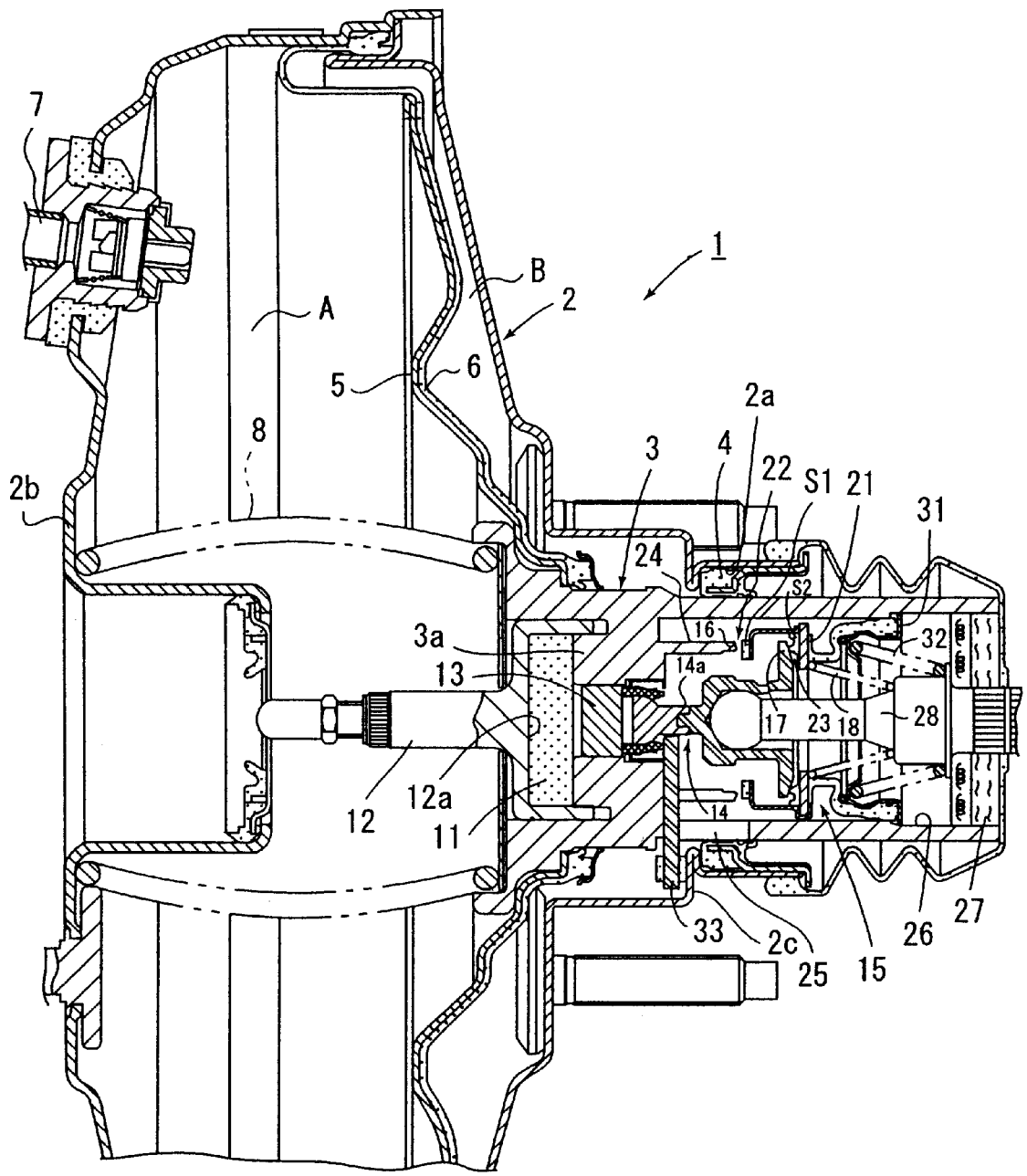
FIG. 1 is a cross section of a first embodiment of the present invention.

Referring to the drawings, several embodiments of the present invention will now be described. Initially referring to FIGS. 1 and 2, a brake booster 1 has a shell 2, in which a substantially tubular valve body 3 is slidably disposed. Toward the rear end, the outer periphery of the valve body 3 projects externally through a rear opening 2a of the shell 2 in which an annular seal member 4 is disposed to maintain a hermetic seal between the outer periphery of the valve body 3 toward the rear end and the opening 2a in the shell 2.

A power piston 5 is connected around the outer periphery of the valve body 3, and a diaphragm 6 is applied to the back surface of the power piston 5, thus partitioning the interior of the shell 2 into a forwardly located constant pressure chamber A and a rearwardly located variable pressure chamber B.

The shell 2 has a front wall 2b, to which a negative pressure introducing tube 7 is connected, through which a negative pressure is normally introduced into the constant pressure chamber A. A return spring 8 is disposed within the constant pressure chamber A to urge the valve body 3 normally rearward, and accordingly, in the inoperative condition of the brake booster 1 shown in FIGS. 1 and 2, the valve body 3 as urged by the return spring 8 remains at rest in its inoperative position shown, which is a rearmost position.

At its front end and toward the inner periphery, the valve body 3 is formed with a forwardly extending annular projection 3a, and a reaction disc 11 is disposed forwardly of and adjacent to the annular projection 3a.

The reaction disc 11 is received in a recess 12a formed in one end of an output shaft 12 and the recess 12a which has received the reaction disc 11 therein slidably fits around the annular projection 3a of the valve body 3, whereby the reaction disc 11 is held sandwiched between the end face of the recess 12a and the end face of the annular projection 3a.

An opening is formed in the front wall 2b of the shell 2, through which a housing and a piston of a master cylinder, not shown, are inserted into the constant pressure chamber A so that the piston of the master cylinder is disposed in abutment against the front end of the output shaft 12.

A plunger plate 13 is slidably fitted into the inner periphery of the valve body 3 at a location rearward of and adjacent to the reaction disc 11, and a valve plunger 14 is inserted inside the inner periphery of the valve body 3 at a location rearward of the plunger plate 13 so as to be axially movable. The front end of the valve plunger 14 is disposed in abutment against the plunger plate 13.

A valve mechanism 15 which switches a communication between the constant pressure chamber A and the variable pressure chamber B and a communication between the variable pressure chamber B and the atmosphere is received within the valve body 3.

The valve mechanism 15 comprises an annular vacuum valve seat 16 formed on the inner periphery of the valve body 3, the valve plunger 14 inserted into the inner periphery of the valve body 3 so as to be movable and having an atmosphere valve seat 17 formed on a rear part thereof, and a valve element 21 which is adapted to be seated on the vacuum valve seat 16 and the atmosphere valve seat 17 from the rear side under the resilience of a spring 18.

A combination of the vacuum valve seat 16 and a first seat area S1 of the valve element 21 which moves into engagement therewith or disengagement therefrom defines a vacuum valve 22, and a combination of the atmosphere valve seat 17 and a second seat area S2 of the valve element 21 which moves into engagement therewith or disengagement therefrom defines an atmosphere valve 23.

A space located radially outward of the vacuum valve 22 communicates with the constant pressure chamber A through a constant pressure passage 24 formed in the valve body 3. A space located between the vacuum valve 22 and the atmosphere valve 23 communicates with the variable pressure chamber B through a radially extending variable pressure passage 25 formed in the valve body 3. Finally, a space located radially inward of the atmosphere valve 23 communicates with the atmosphere through an atmosphere passage 26 formed in the valve body 3 and a filter 27 disposed therein.

A rear end of the valve plunger 14 is pivotally connected with a front end of an input shaft 28, and a spring 32 having a greater resilience than the spring 18 is disposed between a retainer 31 fitted into the inner periphery of the valve body 3 and the outer periphery of the input shaft 28. The other end of the input shaft 28 is connected to a brake pedal, not shown.

A key member 33, which is known in itself, passes through the variable pressure passage 25 in the valve body 3, and is fitted with an engaging portion 14a of the valve plunger 14.

Figure 2:
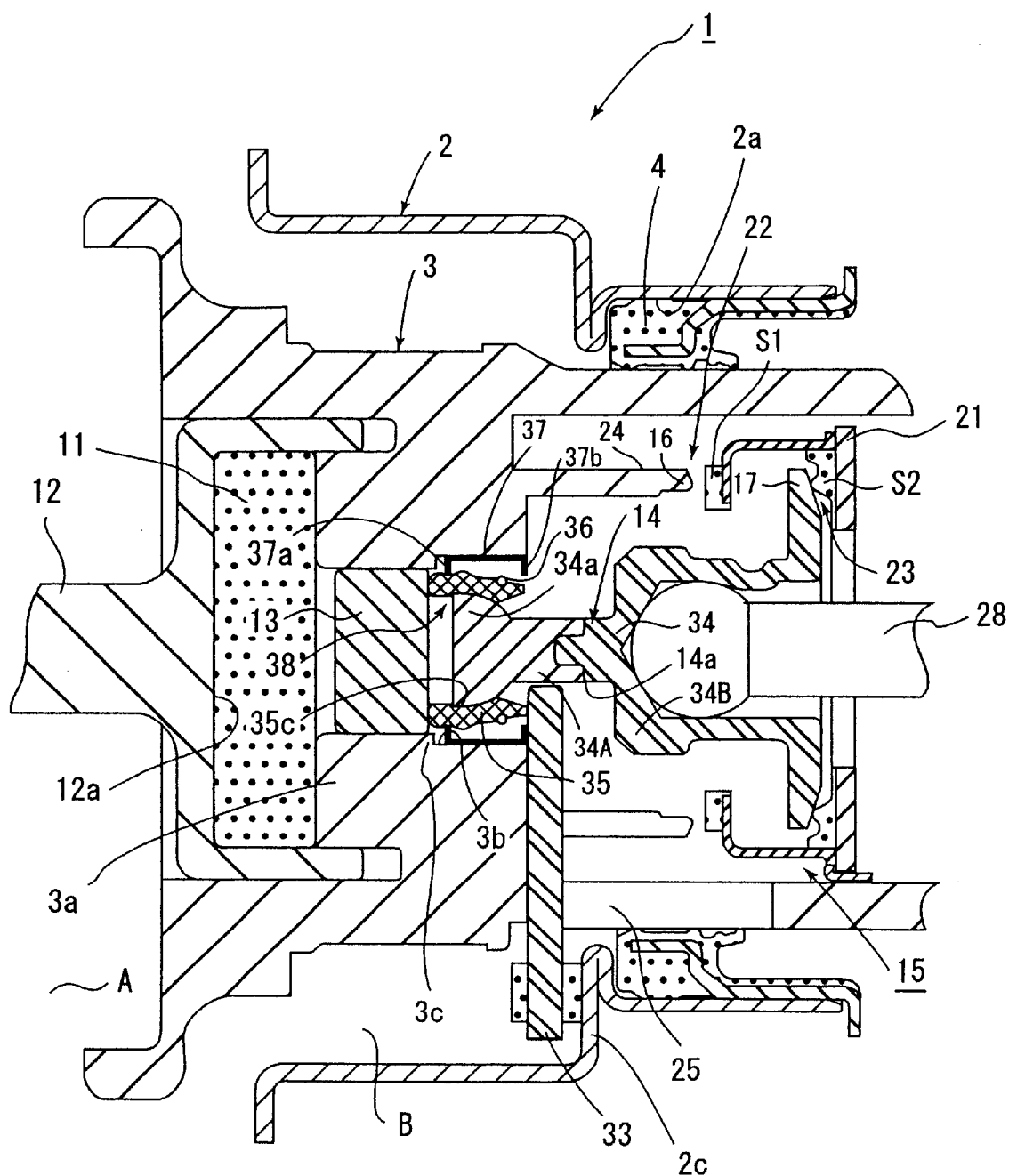
FIG. 2 is an enlarged view of an essential part shown in FIG. 1.

Since the valve body 3 is normally urged rearward by the return spring 8, in the inoperative condition of the brake booster 1 shown in FIGS. 1 and 2, the key member 33 abuts against a rear wall 2c of the shell 2. A front end face of the variable pressure passage 25 abuts against the key member 33 and also abuts against a front end of the engaging portion 14a of the valve plunger.

When the key member 33 is disposed in abutment against the rear wall 2c of the shell 2 in this manner, the key member 33 and the valve plunger 14 are maintained at given positions relative to the valve body 3, thus restricting the back-and-forth movement thereof. In this manner, a lost motion of the input shaft at the commencement of operation of the brake booster 1 is reduced.

In the inoperative condition, the second seat area S2 on the valve element 21 is seated on the atmosphere valve seat 17 to close the atmosphere valve 23, while the first seat area S1 of the valve element 21 is removed from the vacuum valve seat 16 to open the vacuum valve 22. Under this condition, the chambers A and B communicate with each other and a negative pressure is introduced into the both chambers.

In the inoperative condition, the rear end face of the reaction disc 11 is slightly spaced from the opposing plunger plate 13. By contrast, when the input shaft 28 and the valve plunger 14 are driven forward when the brake booster is actuated, a reaction from the output acting upon the output shaft 12 causes the reaction disc 11 to bulge rearward, whereby the end face of the reaction disc 11 abuts against the plunger plate 13. A reaction to the output acting upon the output shaft 12 begins to be transmitted from this point in time to the valve plunger 14, the input shaft 28 and the brake pedal, not shown, through the reaction disc 11 and the plunger plate 13.

The described arrangement remains unchanged from a conventional brake booster known in the art.

In the present embodiment, the valve plunger 14 and its associated parts are improved in a manner to be described below so that an output from the brake booster 1 can be rapidly increased in immediate response to the quick depression of the brake pedal.

Figure 3:
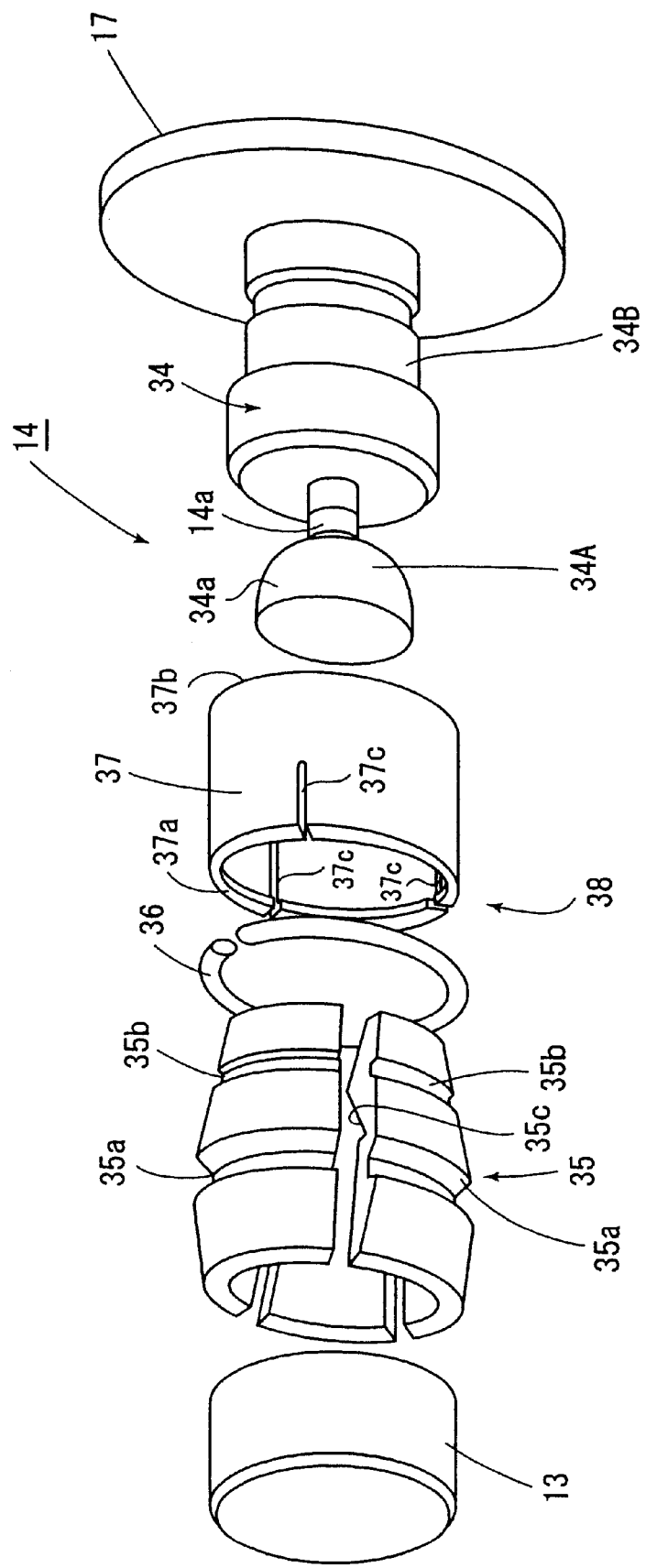
FIG. 3 is an exploded perspective view of an essential part shown in FIG. 1.

Specifically, referring to FIGS. 2 and 3, the valve plunger 14 of the present embodiment comprises a body 34 which is located rearmost and on which the atmosphere valve seat 17 is formed, a substantially cylindrical engaging member 35 which is mounted around the outer periphery of semi-spherical portion 34a at the front portion of the body 34, a C-ring 36 detented around the periphery of the engaging member 35 and a cylindrical sleeve 37 disposed in surrounding relationship with the engaging member 35 and engaged with the outer periphery thereof. The engaging member 35, C-ring 36, the sleeve 37 and the semi-spherical portion 34a in combination define together length adjusting means 38, which allows the axial size of the entire valve plunger 14 to be reduced during the emergency brake operation as will be further described later.

As mentioned previously, the plunger plate 13 is disposed in the inner periphery of the valve body 3 at a location forward of and adjacent to the valve plunger 14, and is disposed in abutment against the front end of the valve plunger 14 or the front end of the engaging member 35.

The body 34 comprises a front member 34A which forms the semispherical portion 34a, and a rearwardly located plunger member 34B. The rearwardly located plunger member 34B is in the similar configuration as a rear portion of a conventional valve plunger, and the input shaft is connected to the plunger member 34B and the atmosphere valve seat 17 is formed thereon. The front end of the plunger member 34B is formed with a projection of a reduced diameter in axial alignment with the axis thereof. On the other hand, a front portion of the front member 34A is formed as the semi-spherical portion 34a, and a recess is formed in a rear portion of the front member 34A in alignment with the axis thereof. The front projection of the plunger member 34B is a press fit in the recess formed in the rear portion of the front member 34a, thus coupling the both members together to define the body 34.

The engaging portion 14a is formed by a portion of a reduced diameter which connects between the front member 34A and the plunger member 34B, and the key member 33 is fitted around the engaging portion 14a.

The semi-spherical portion 34a of the front member 34A has its flat surface directed forward and has its semi-spherical surface directed rearward. Accordingly, the flat surface of the semi-spherical portion 34a defines the front end of the body 34.

The engaging member 35 comprises three trough-shaped members of an equal size which are disposed to be adjacent to each other circumferentially, and is generally cylindrical in configuration. The engaging member 35 which comprises three members in this manner is conically shaped so that the diameter gradually decreases from the axial front portion toward the rear portion.

A pair of circumferentially extending grooves 35a and 35b are formed around the outer periphery of the engaging member 35 in its front and rear portions. The C-ring 36 is engaged with the rear groove 35b formed in the engaging member, thus clamping the engaging member 35, which comprises three members, together into a cylindrical configuration.

A circumferentially extending groove 35c is formed in the inner periphery of the engaging member 35 in its front portion, and the groove 35 is shaped in conformity to the edge of the flat surface of the semi-spherical portion 34a (or the corner along the outer periphery), thus allowing the semi-spherical portion 34a to be engaged with the groove 35c and the inner periphery of the engaging member 35 which is located immediately rearward of the groove 35c.

The sleeve 37 is formed with a pair of radially inwardly extending flanges 37a and 37b at its front and rear ends. The sleeve 37 is formed of a resilient metal, and three rectilinear slits 37c which are circumferentially spaced apart around the outer periphery are formed in the front end of the sleeve, inclusive of the flange 37a, extending toward the axial center. It will be seen that because the sleeve 37 is formed with slits 37c at three locations which are spaced apart and exhibits resilience, the front end (or flange 37a) of the sleeve 37 can be increased in diameter.

The sleeve 37 is fitted over the engaging member 35 from the rear side, and the flange 37a located at the front end of the sleeve is engaged with the front groove 35a formed in the engaging member 35. The sleeve 37 has an axial size which is slightly less than the axial size of the engaging member 35, and accordingly, when the flange 37a is engaged with the groove 35a, the rear end of the engaging member 35 is located at the same axial position as the rear end of the sleeve 37.

In the inoperative condition of the brake booster 1 shown in FIG. 2, the rear end of the sleeve 37 (or flange 37b) and the engaging member 35 abut against the key member 33, whereby these members are maintained at rest in their inoperative positions. The front end of the valve plunger 14 is thus defined by the rear end of the sleeve 37 (flange 37b) and the rear end of the engaging member 35.

At a location rearward of and adjacent to the plunger plate 13 which is fitted into the inner periphery of the valve body 3, the inner periphery of the valve body 3 is formed with a guide 3b having a greater internal diameter than the diameter of the inner periphery where the plunger plate is fitted, and a step 3c which is located forward of the guide 3b and which faces rearward. The guide 3b has an axial size which is slightly greater than the axial size of the sleeve 37 on the valve plunger 14. The guide 3b has an internal diameter which is slightly greater than the external diameter of the sleeve 37.

The front portion of the valve plunger 14 (or length adjusting means 38) is inserted into the guide 3b of the valve body 3, and the front end of the engaging member 35, which defines the front end of the valve plunger 14, is disposed in abutment against the plunger plate 13, thus loosely fitting the sleeve 37 in the guide 3b.

In the inoperative condition of the brake booster 1 shown in FIG. 2, the flange 37b of the sleeve 37 and the rear end of the engaging member 35 abut against the key member 33 which abuts against the rear wall 2c of the shell 2. Since the front flange 37a of the sleeve 37 is engaged with the groove 35a in the engaging member 35, the semi-spherical portion 34a is engaged with the internal groove 35c of the engaging member 35. Accordingly, the front end of the engaging member 35 is maintained in a position projecting forward of the flat surface of the semi-spherical portion 34a.

If a brake pedal is gently depressed under this inoperative condition, the input shaft 28 and the valve plunger 14 are driven forward gently, and accordingly, the front end of the sleeve 37 (or flange 37a) cannot abut against the step 3c. When the valve plunger 14 is driven forward in this manner, the vacuum valve 22 is closed while the atmosphere valve 23 is opened. The engaging member 35 is maintained in its projecting position, and the axial size of the entire valve plunger 14 cannot be reduced.

By contrast, when the brake pedal is quickly depressed, the input shaft 28 is driven forward through a given distance or greater relative to the valve body 3 than the distance by which it is driven forward during a normal brake operation. Accordingly, the front end of the sleeve 37 (flange 37a) abuts against the step 3c on the valve body 3, whereby the flange 37a of the sleeve 37 is disengaged from the groove 35a in the engaging member 35 to be displaced rearward thereof. At this time, the outer peripheral edge of the flat surface of the semi-spherical portion 34a increases the diameter of the front portion of the engaging member 35, and concomitantly, the outer peripheral edge of the flat surface of the semi-spherical portion 34a is disengaged from the groove 35c to be displaced forward thereof, allowing the flat surface of the semi-spherical portion 34a to abut against the rear end face of the plunger plate 13.

Figure 7:
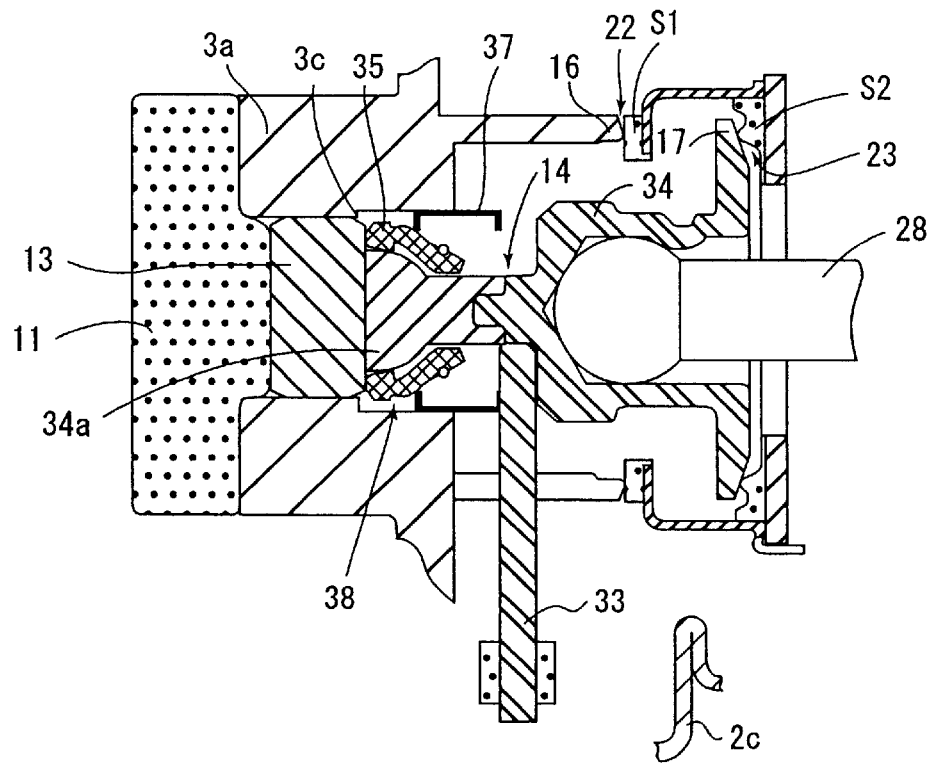
FIG. 7 is a cross section showing still another operational phase during the emergency braking operation of the part shown in FIG. 2.

In other words, at this time, the engaging member 35 which is permitted to move rearward from the projecting position is located at a retracted position, whereby the front end of the engaging member 35 and the flat surface of the semi-spherical portion 34a are disposed on a common plane, resulting in an abutment against the rear end face of the plunger plate 13 (see FIG. 7). When the brake pedal is quickly depressed during an emergency brake operation, the engaging member 35 is changed from its projecting position to its retracted position, and accordingly, the axial size of the entire valve plunger 14 is reduced by an amount by which the engaging member 35 has moved from its projecting position to its retracted position. This allows the opening of the atmosphere valve 23 to be increased during the emergency brake operation, allowing a rapid rise in the output. In addition, the clearance between the reaction disc 11 and the plunger plate 13 increases, allowing the amount by which the reaction disc 11 bulges to increase to allow the output to be increased by a corresponding amount. In this manner, an output of an increased magnitude can be rapidly obtained.

Figure 8:
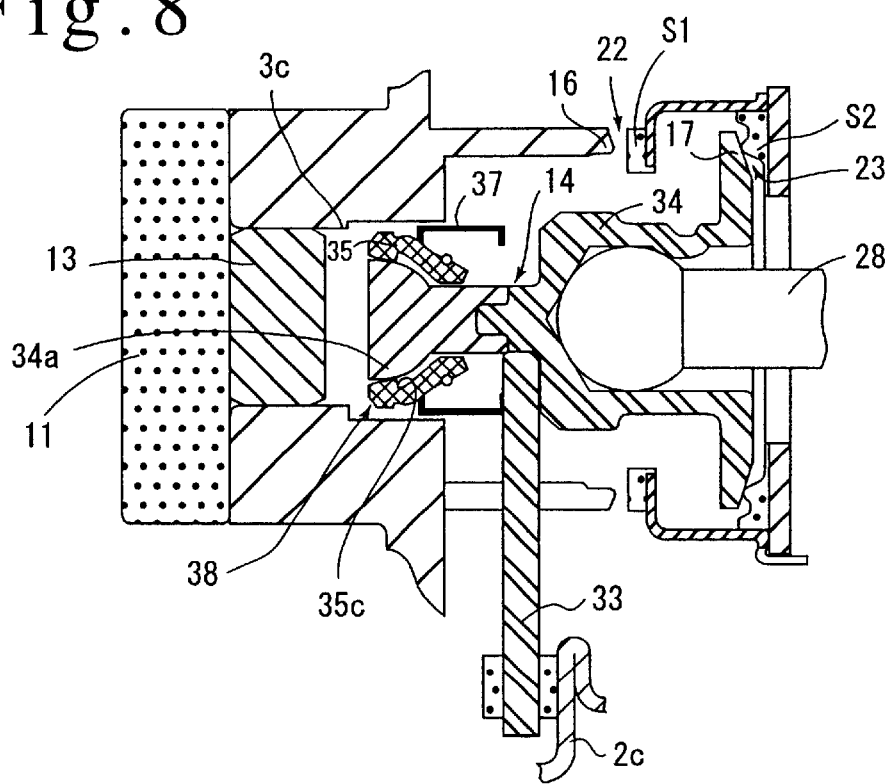
FIG. 8 is a cross section showing a still further operational phase during the emergency braking operation of the part shown in FIG. 2.

If the brake pedal is released during the emergency brake operation, the input shaft 28 and the valve plunger 14 retract rearward, and the key member 33 retracts concomitantly, and comes to a stop upon abutment of the key member 33 against the rear wall 2c of the shell 2 (see FIG. 8). Subsequently, the input shaft 28 and the valve plunger 24 continue to retract, and thus the rear flange 37b of the sleeve 37 abuts against the key member 33 to stop its movement. Subsequently, the body 34 retracts further rearward, and accordingly, the engaging member 35 is displaced forwardly relative to the body 34 by the action of the front flange 37a of the sleeve 37, resulting in an engagement between the groove 35c of the engaging member 35 and the semi-spherical portion 34a (see FIG. 9).

Subsequently, as the engaging member 35 and the body 34 retract, the front flange 37a of the sleeve 37 becomes engaged with the groove 35a in the engaging member 35, whereby the engaging member 35 and the body 34 come to a stop at their inoperative positions. Thus, the valve plunger 14 and the input shaft 28 return to their inoperative positions, and the engaging member 35 of the valve plunger 14 is maintained in its projecting position. Immediately thereafter, the front end face of the variable pressure passage 25 abuts against the key member 33, and the valve body 3 also returns to its inoperative position where it comes to a stop.

In this manner, in the present embodiment, the key member 33 and the sleeve 37 function as switching means which causes the engaging member 35 which assumes the retracted position to resume its projecting position.

Operation

With the described arrangement, in the inoperative condition of the brake booster 1 shown in FIGS. 1 and 2, the key member 33 abuts against the rear wall 2c of the shell 2. The front end face of the variable pressure passage 25 abuts against the key member 33, whereby the valve body 3 stays at rest at its inoperative position.

The flange 37b of the sleeve 37 and the rear end of the engaging member 35 (or the front end of the engaging portion 14a) of the valve plunger 14 are in abutment against the key member 33. Accordingly, the flange 37a of the sleeve 37 is engaged with the groove 35a in the engaging member 35 and the semi-spherical portion 34a is engaged with the groove 35c in the engaging member 35. In other words, the engaging member 35 assumes the projecting position where it projects forwardly relative to the semi-spherical portion 34a. The front end of the sleeve 37 (or flange 37a) is spaced from the step 3c of the valve body 3.

In the inoperative condition, the second seat area S2 of the valve element 21 is seated upon the atmosphere valve seat 17 to close the atmosphere valve 23. The vacuum valve seat 16 is removed from the first seat area S1 of the valve element 21 to open the vacuum valve 22. Accordingly, the chambers A and B communicate with each other, into which a negative pressure is introduced. In this inoperative condition, the rear end face of the reaction disc 11 is slightly spaced from the plunger plate 13, and the front end of the valve plunger 14 (or the front end of the engaging member 35) abuts against the rear end face of the plunger plate 13.

Operation During a Normal Gentle Brake Depression

When the brake pedal, not shown, is gently depressed in the inoperative condition, the input shaft 28 and the valve plunger 14 are gently driven forward. Accordingly, the first seat area S1 of the valve element 21 becomes seated upon the vacuum valve seat 16 on the valve body 3 to close the vacuum valve 22, while the atmosphere valve seat 17 is removed from the second seat area S2 of the valve element 21 to open the atmosphere valve 23. Because the vacuum valve 22 is closed while the atmosphere valve 23 is opened, the atmosphere is introduced into the variable pressure chamber B through the variable pressure passage 25, and a pressure differential between the negative pressure in the constant pressure chamber A and the atmosphere in the variable pressure chamber B causes the valve body 3 and the output shaft 12 to be driven forward.

It is to be noted that when the valve plunger 14 is gently driven forward, the front flange 37a of the sleeve 37 does not abut against the step 3c on the valve body 3.

Figure 4:
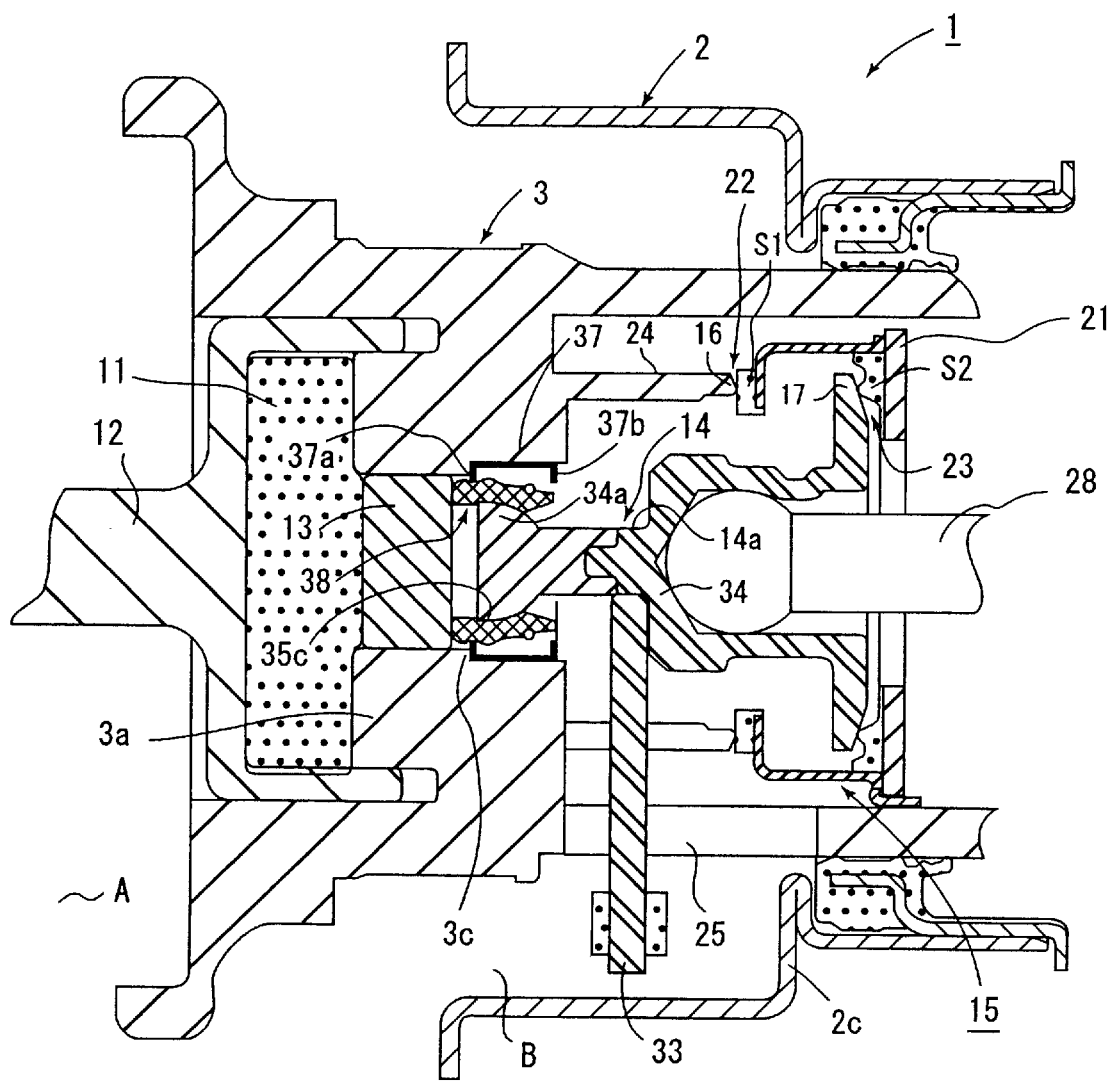
FIG. 4 is a cross section showing an operational phase during an emergency braking operation of the part shown in FIG. 2.

When the brake booster 1 is actuated in this manner, a reaction from the output acting upon the output shaft 12 causes the reaction disc 11 to bulge rearward, whereupon the rear end face of the reaction disc 11 abuts against the plunger plate 13 (see FIG. 4). From this point in time on, a reaction from the output acting upon the output shaft 12 begins to be transmitted to the valve plunger 14, the input shaft 28 and the brake pedal, not shown, through the reaction disc 11 and the plunger plate 13.

Accordingly, the vacuum valve 22 and the atmosphere valve 23 are operated to control the pressure in the variable pressure chamber B so that the brake reaction transmitted to the valve plunger 14 is balanced with the input applied to the input shaft 28. Since the brake reaction acts gently from the plunger plate 13 to the engaging member 35, it has little effect to enlarge the diameter of the front end of the engaging member 35, and accordingly, the semi-spherical portion 34a is maintained in engagement with the groove 35c in the engaging member 35. Thus, the engaging member 35 is maintained in its projecting position.

Accordingly, during the normal brake operation where the brake pedal is gently depressed, the axial size of the valve plunger 14 remains unchanged, and there is no change in the clearance between the reaction disc 11 and the plunger plate 13, and accordingly the amount by which the reaction disc 11 bulges in response to the output also remains unchanged. Consequently, the amount by which the output increases until the reaction from the reaction disc 11 begins to be transmitted to the valve plunger 14 or the so-called jumping amount remains to be normal.

When the brake pedal is released during the normal brake operation, as the valve plunger 14 and the input shaft 28 retract rearward, the power piston 5 and the valve body 3 also retract and the key member 33 comes to a stop upon abutment against the rear wall 2c of the shell 2. Subsequently, the engaging member 35 and the sleeve 37 abut against the key member 33 to stop the movement of the valve plunger 14 and the input shaft 28. As the valve body retracts and the front end face of its variable pressure passage 25 abuts against the key member, the valve body 3 and the valve plunger 14 return to their inoperative positions shown in FIGS. 1 and 2.

In this manner, during the normal gentle brake operation, there is no reduction in the axial size of the valve plunger 14, and the operation remains the same as in the conventional brake booster in which the valve plunger 14 is formed by a single member.

Emergency Brake Operation

Figure 5:
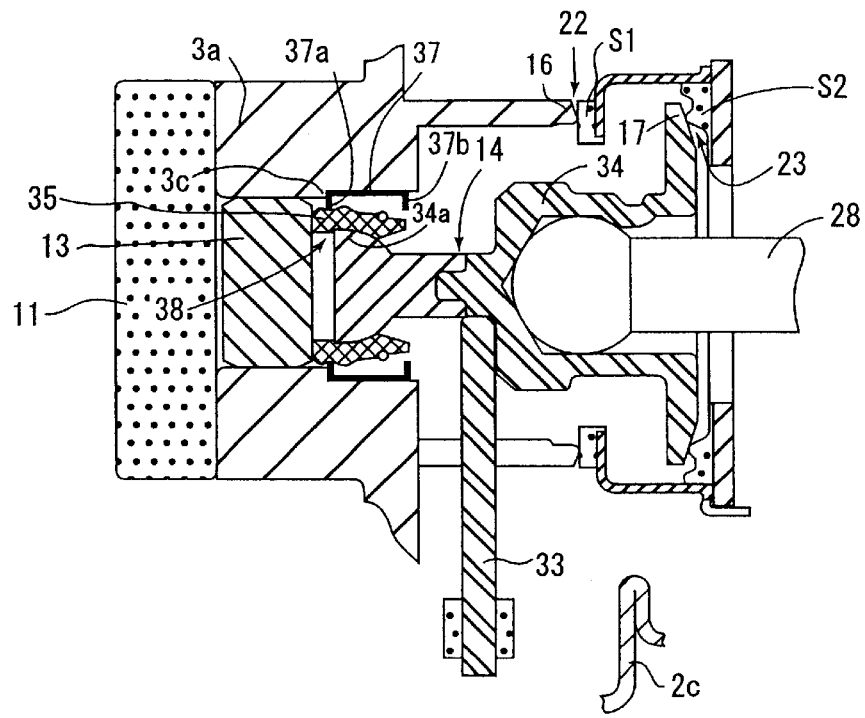
FIG. 5 is a cross section showing another operational phase during the emergency braking operation of the part shown in FIG. 2.
Figure 6:
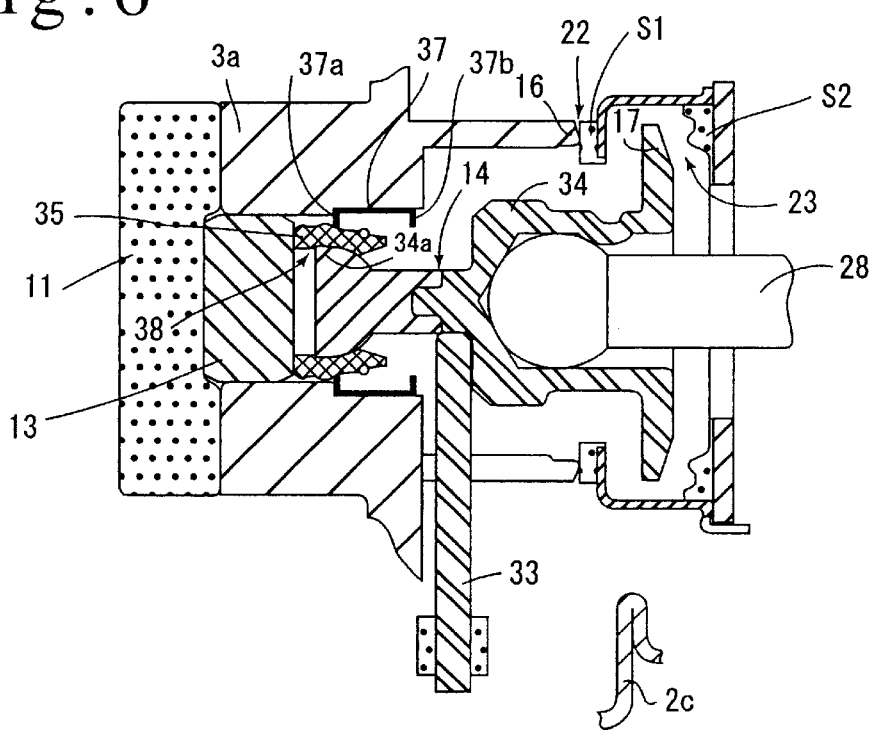
FIG. 6 is a cross section showing a further operational phase during the emergency braking operation of the part shown in FIG. 2.

By contrast, when the brake pedal is quickly depressed in the inoperative condition shown in FIGS. 1 and 2, the valve plunger 14 is driven forward through a stroke which is greater than the stroke which occurs during a normal brake operation before a brake reaction from the output shaft 12 is produced (see FIGS. 5 and 6).

Accordingly, the first seat area S1 of the valve element 21 becomes seated upon the vacuum valve seat 16 to close the vacuum valve 22 while the atmosphere valve seat 17 is removed from the second seat area S2 of the valve element 21 to open the atmosphere valve 23, thus allowing the atmosphere to be introduced into the variable pressure chamber B to drive the valve body 3 forward to actuate the brake booster 1.

The flange 37a of the sleeve 37 which forms part of the valve plunger 14 abuts against the step 3c on the valve body 3, and the body 34 then remains urged forwardly. Consequently, the engaging member 35 and the body 34 are driven forward through an increased stroke as compared with a stroke by which they are driven forward during a normal brake operation relative to the sleeve 37 and the valve body 3, and concomitantly, the front flange 37a of the sleeve 37 is disengaged from the groove 35a in the engaging member 35 to engage the tapered portion of the outer periphery which is located rearward of the groove 35a. Concomitantly, the front portion of the engaging member 35 has its diameter increased by the effect that the outer peripheral edge of the flat surface of the semi-spherical portion 34a urges. As a consequence, the semi-spherical portion 34a is disengaged from the groove 35c in the engaging member 35 to move forwardly thereof, and the flat surface of the semi-spherical portion 34a abuts against the plate plunger 13. In this manner, the engaging member 35 is located at its retracted position where it has retracted relative to the body 34, thus reducing the axial size of the entire valve plunger 14.

Since the axial size of the entire valve plunger 14 is reduced in comparison to the axial size which is assumed during a normal brake operation, the opening to which the atmosphere valve 23 is opened (or the separation between the atmosphere valve seat 17 and the second seat area S2) increases. As a consequence, the atmosphere is more rapidly introduced into the variable pressure chamber B through the atmosphere valve 23 which is opened to a greater opening than during the normal brake operation, allowing the output from the brake booster 1 to rise rapidly.

A reaction from the output causes the reaction disc 11 to bulge rearward and to abut against the plunger plate 13 to thereby urge the valve plunger 14 rearward (FIG. 7), but because the amount by which the reaction disc 11 bulges until the atmosphere valve seat 17 on the valve plunger 14 becomes seated upon the second seat area S2 of the valve element 21 is greater than during the normal brake operation, the output from the brake booster 1 increases by an corresponding amount. This allows an output of an increased magnitude to be rapidly obtained from the brake booster 1 in immediate response to a quick depression of the brake pedal.

Release

When the brake pedal is released during the emergency brake operation, the valve plunger 14 and the input shaft 28 retract. Accordingly, the atmosphere valve seat 17 becomes seated upon the second seat area S2 of the valve element 21 to close the atmosphere valve 23 while the vacuum valve seat 16 moves away from the first seat area S1 of the valve element 21 to open the vacuum valve 22. Accordingly, the atmosphere is displaced from the variable pressure chamber B into the constant pressure chamber A, causing the valve body 3 and the power piston 5 to retract toward their inoperative positions.

Figure 9:
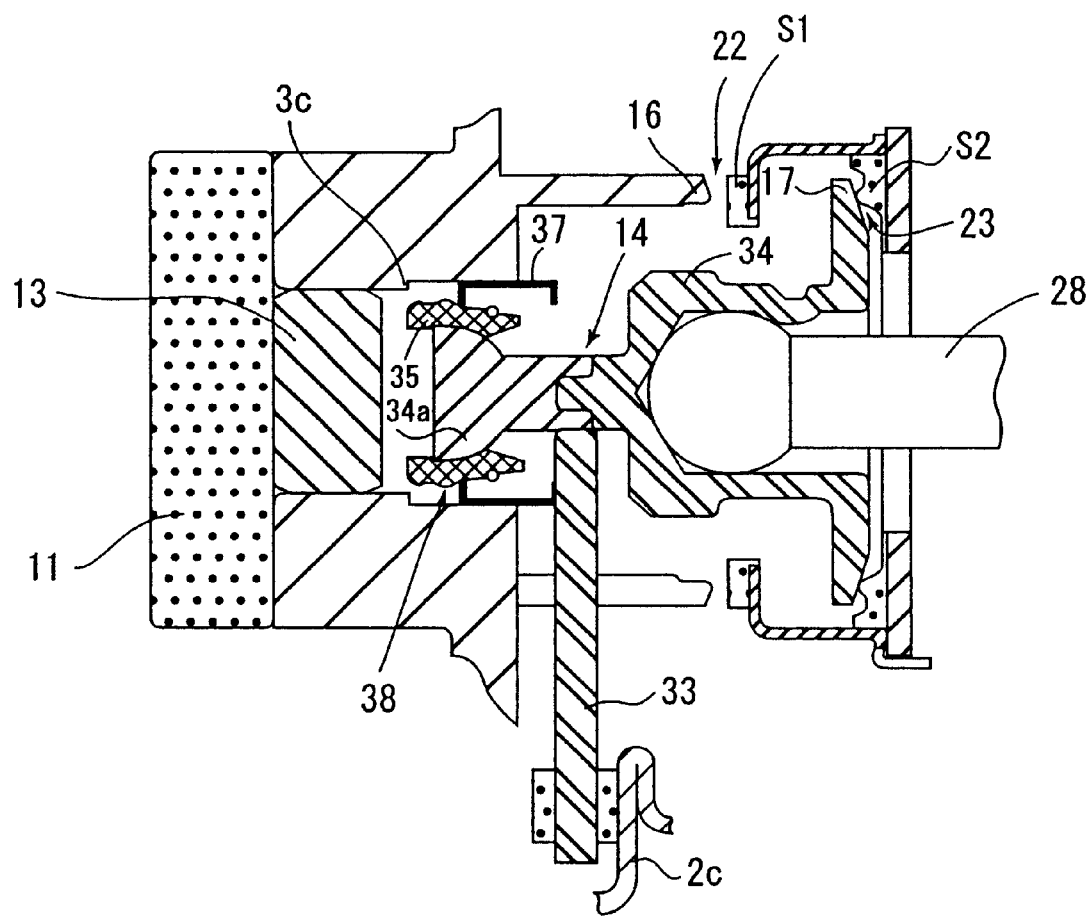
FIG. 9 is a cross section showing an additional operational phase during the emergency braking operation of the part shown in FIG. 2.

Subsequently, the key member 33 initially abuts against the rear wall 2c of the shell 2 to stop its movement, and as the input shaft 28 and the valve plunger 14 continue to retract subsequently, the rear flange 37b of the sleeve 37 abuts against the key member 33 to stop its movement (FIG. 8). The input shaft 28 and the body 34 then continue to retract rearward, whereby the front flange 37a of the sleeve 37 causes the engaging member 35 to be driven forward relative to the body 34, thus causing the groove 35c of the engaging member 35 to be engaged with the semi-spherical portion 34a. As the engaging member 35 and the body 34 continue to retract further, the front flange 37a of the sleeve 37 becomes engaged with the groove 35a in the engaging member 35, whereupon the engaging member 35 and the body 34 stop at their inoperative positions (FIG. 9). In this manner, the valve plunger 14 and the input shaft 28 return to their inoperative positions and the engaging member 35 returns to its projecting position. Immediately thereafter, the front end face of the variable pressure passage 25 abuts against the key member 33, whereby the valve body 3 returns to its inoperative position shown in FIG. 2 and stops its movement.

As described, in the present embodiment, there can be provided a brake booster 1 which allows the output to rise rapidly during the emergency brake operation, using a simple construction including the provision of the length adjusting means 38 on the front portion of the valve plunger 14 and an improvement of associated parts. The simple construction allows the reliability of the brake booster 1 during the emergency brake operation to be improved.

It is to be understood that the sleeve 37 which exhibits a resilience used in the described embodiment may be formed by a rigid body while the engaging member 35 may be formed of an elastic member as may be formed of synthetic resin or hard rubber.

Second Embodiment

Figure 10:
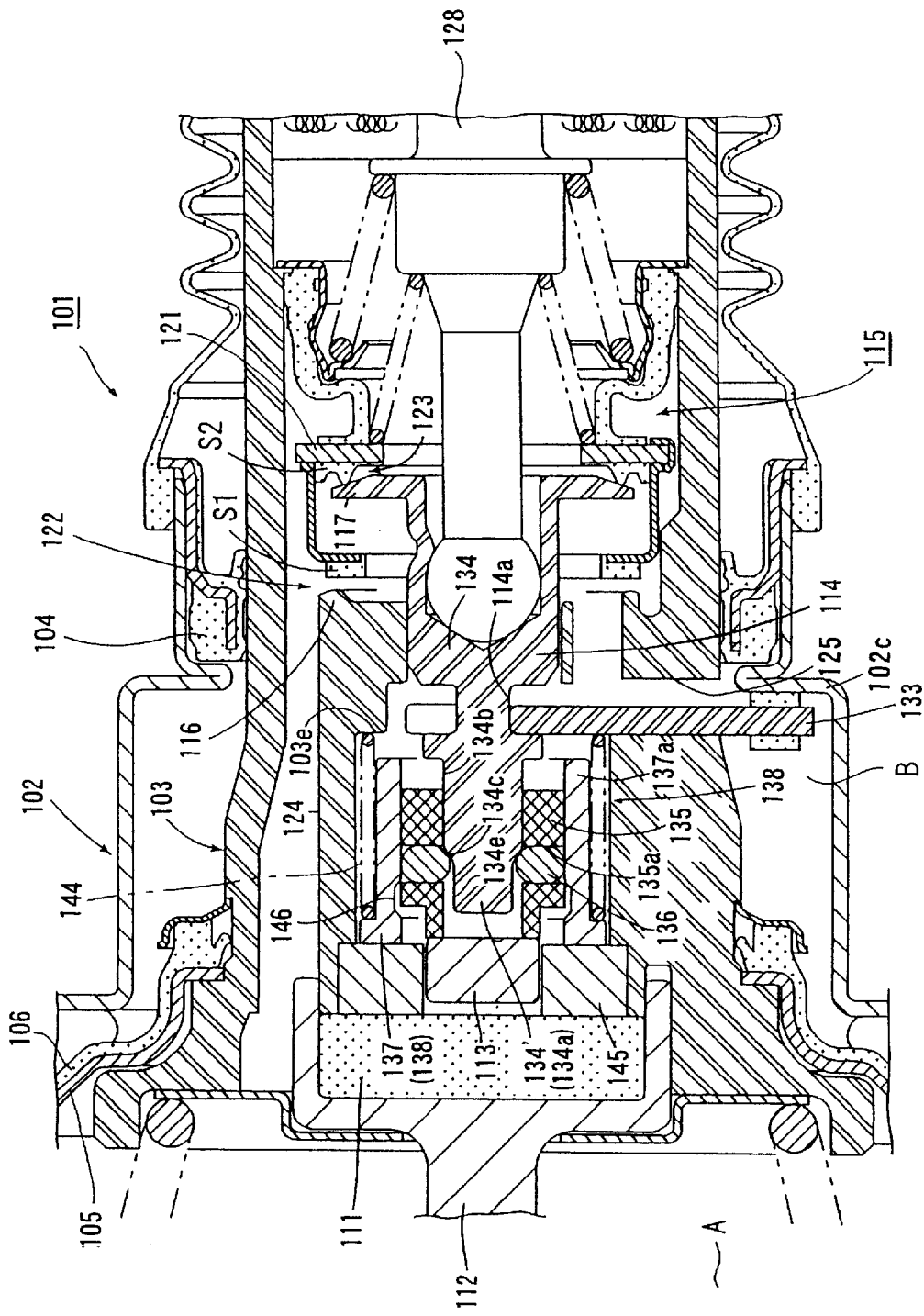
FIG. 10 is an enlarged cross section of an essential part of a second embodiment of the present invention.

FIG. 10 shows a second embodiment of the present invention having length adjusting means 138 which is distinct from that used in the first embodiment. It should be understood that corresponding parts to those shown in the first embodiment are designated by like reference numerals as used before, to which 100 is added.

Specifically, the length adjusting means 138 comprises a cylindrical engaging member 135 slidably fitted around a stepped rod 134', which forms a front portion of a body 134 of a valve plunger 114, a detent member 136 which is loosely fitted in a through-opening 135a formed at a given circumferential position of the engaging member 135 so as to be radially movable therein, a cylindrical sleeve 137 surrounding the engaging member 135 and the detent member 136 and axially movable relative to the engaging member 135, and a spring 144 disposed between the sleeve 137 and the rear step 103e of a valve body 103 to urge the sleeve 137 forwardly. In its inoperative condition, the sleeve 137 is maintained at its advanced position where it abuts against a rear end face of a reaction disc abutment member 145 which is disposed as a press fit into the inner periphery of the valve body 103 and forms part thereof substantially.

In a similar manner as mentioned above, the engaging member 135, the detent member 136, the sleeve 137 and the stepped rod 134' form together the length adjusting means 138, which allows the axial size of the valve plunger 114 to be reduced during the emergency brake operation as will be further described later.

A plunger plate 113 is disposed within the inner periphery of the valve body 103 at a location forward of and adjacent to the valve plunger 114 and is disposed in abutment against an end of the valve plunger 114. The body 134 of the valve plunger 114 is shaped in the same configuration as a rear portion of a conventional valve plunger, and is connected to an input shaft 128 and is formed with an atmosphere valve seat 117 thereon.

An annular groove is formed around the body 134 at a location rearward of the stepped rod 134' and defines an engaging portion 114a, into which a key member 133 is fitted.

The stepped rod 134' of the body 134 comprises a larger diameter portion 134b disposed at an axially rear portion for supporting the engaging member 135 which is fitted therearound so as to be movable relative thereto, a tapered portion 134c which is located at an axially medium portion and continuing from the larger diameter portion 134b and having a diameter which gradually decreases in the forward direction, and a smaller diameter portion 134e continuing from the tapered portion 134c and located at an axially front portion. When a relative movement occurs in the axial direction between the body 134 and the engaging portion 135, the detent member 136 abuts against either one of the larger diameter portion 134b, the tapered portion 134c and the smaller diameter portion 134e.

The detent member 136 which abuts against the stepped rod 134' of the body 134 is substantially in an elliptical configuration and has an radial size which is greater than the radial size of a through-opening 135a formed in the engaging member 135. In the second embodiment, it is configured such that its radially outer portion is slightly recessed from the radially outer opening of the though-opening 135a when its radially inner portion is in abutment against the smaller diameter portion 134e.

An annular recess 146 which is capable of accommodating a radially outer portion of the detent member 136 is formed at a given position in the inner peripheral surface 137a of the sleeve 137 which is formed to be slightly greater than the engaging member 135. The recess 146 is formed at a given distance forward of the front end of the tapered portion 134c when the body 134 is located at its inoperative position where it abuts against the key member 133 which in turn abuts against a wall 102c of a shell 102.

In the inoperative condition of a brake booster 101 shown in FIG. 10, the valve plunger 114 assumes its retracted end position where it abuts against the key member 133 which in turn abuts against the wall 102c of the shell 102 while the sleeve 137 assumes its advanced end position where it abuts against a reaction abutment member 145. Under this condition, the detent member 136 abuts against the smaller diameter portion 134e of the body 134 and the inner peripheral surface 137a of the sleeve 137 to be disposed radially inward.

If a brake pedal is gently depressed in the inoperative condition, an input shaft 128 and the valve plunger 114 are gently driven forward. When the valve plunger 114 is driven forward, a vacuum valve 122 is closed while an atmosphere valve 123 is opened to drive the valve body 103 and its abutting sleeve 137 forward, and accordingly, the input shaft 128 cannot be driven forward more than a given distance relative to the valve body 103. The tapered portion 134c of the body 134 abuts against the detent member 136 to urge it radially outward, but because the detent member 136 abuts against the inner peripheral surface 137a of the sleeve 137 and cannot move radially outward, the detent member 136 causes the body 134 and the engaging member 135 to move forward in an integral manner, and thus there is no reduction in the axial size of the entire valve plunger 114.

By contrast, when the brake pedal is quickly depressed, the input shaft 128 is driven forward through more than the given distance relative to the valve body 103 and the sleeve 137 as compared with the distance through which it is driven forward during the normal brake operation. Accordingly, the detent member 136 which is engaged with the tapered portion 134c of the body 134 to be driven forward will be situated in the recess 146 formed in the inner peripheral surface 137a of the sleeve 137. Then it follows that the detent member 136 which is driven forward by engagement with the tapered portion 134c will move in the radial direction while its radially outer portion is accommodated in the recess 146. In this manner, the body 134 will be driven forward relative to the valve body 103 and the engaging member 135.

Operation

With the described arrangement, in the inoperative condition of the brake booster 101 shown in FIG. 10, the key member 133 abuts against the rear wall 102c of the shell 102. The front end face of a variable pressure passage 125 abuts against the key member 133, whereby the valve body 103 remains at rest at its inoperative position.

The front end face of the engaging portion 114a of the body 134 abuts against the key member 133 while the front end face of the engaging member 135 abuts against the plunger plate 113. In this manner, the engaging member 135 is located at its projecting position where it projects forwardly relative to the body 134. Under this condition, the detent member 136, which is accommodated in the through-opening 135a formed in the engaging member 135, will be situated radially inward where it abuts against the smaller diameter portion 134e of the body 134 and the inner peripheral surface 137a of the sleeve 137. The front end of the sleeve 137 abuts against the reaction disc abutment member 145 on the valve body 103.

In this inoperative condition, the second seat area S2 of a valve element 121 is seated upon the atmosphere valve seat 117 to close the atmosphere valve 123. The vacuum valve seat 116 is removed from the first seat area S1 of the valve element 121 to open the vacuum valve 122. Accordingly, the chambers A and B communicate with each other, and a negative pressure is introduced into the both chambers. In the inoperative condition, the rear end face of the reaction disc 111 is slightly spaced from the plunger plate 113, and a front end of the valve plunger 114 (or the front end of the engaging member 135) abuts against the rear end face of the plunger plate 113.

Operation During a Normal Gentle Brake Depression

When a brake pedal, not shown, is gently depressed in the inoperative condition, the input shaft 128 and the valve plunger 114 are gently driven forward in response thereto. Accordingly, the first seat area S1 of the valve element 121 becomes seated upon the vacuum valve seat 116 on the valve body 103 to close the vacuum valve 122 while the atmosphere valve seat 117 moves away from the second seat area S2 of the valve element 121 to open the atmosphere valve 123. In this manner, the vacuum valve 122 is closed while the atmosphere valve 123 is opened, and accordingly, the atmosphere is introduced into the variable pressure chamber B through the variable pressure passage 125. Accordingly, a pressure differential between the negative pressure in the constant pressure chamber A and the atmosphere in the variable pressure chamber B drives the valve body 103, the sleeve 137 and the output shaft 112 forward.

Figure 11:
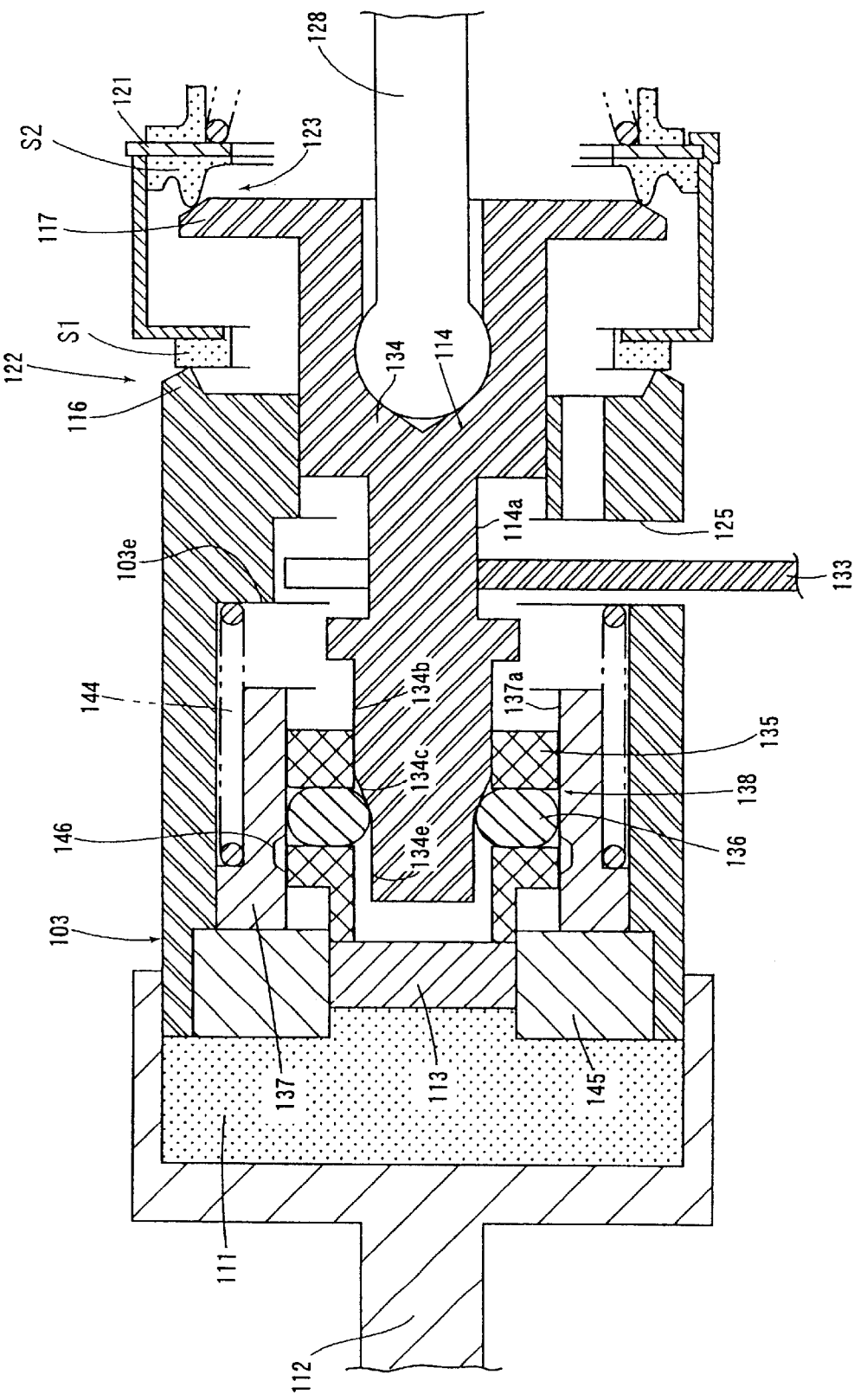
FIG. 11 is a cross section showing an operational phase during a normal braking operation of the part shown in FIG. 10.

It will be seen that the detent member 136 abuts against the tapered portion 134c of the body 134 to be urged radially outward, but because its radially outer portion is in abutment against the inner peripheral surface 137a of the sleeve 137, the detent member 136 is maintained radially inward if it abuts against the tapered portion 134c, whereby the engaging member 135 is driven forward while it is engaged with the body 134. In other words, the engaging member 135 is driven forward while maintaining its projecting position (FIG. 11).

Consequently, during the normal brake operation which occurs when the brake pedal is gently depressed, there is no change in the axial size of the valve plunger 114, and there is no change in the clearance between the reaction disc 111 and the plunger plate 113, and accordingly, the amount by which the reaction disc 111 bulges in response to the output does not change. Thus, an amount by which the output rises before a reaction from the reaction disc 111 begins to be transmitted to the valve plunger 114 or the so-called jumping amount remains normal.

If the brake pedal is released during the normal brake operation and the valve plunger 114 and the input shaft 128 retract rearward, the valve body 103 and the sleeve 137 also retract, and the key member 133 comes to a stop upon abutment against the wall 102c of the shell 102. Subsequently, the front end face of the engaging portion 114a of the valve plunger 114 abuts against the key member 133 to stop the movement of the valve plunger 114 and the input shaft 128. Subsequently, the front end face of the variable pressure passage 125 abuts against the key member 133 as the valve body 103 and the valve plunger 114 retract, whereby the valve body 103 and the valve plunger 114 return to their inoperative positions shown in FIG. 10.

In this manner, there is no reduction in the axial size of the valve plunger 114 during the normal, gentle brake operation, and accordingly, the operation remains the same as in a conventional brake booster in which the valve plunger 114 is formed by a single member.

Operation During the Emergency Brake Operation

By contrast, when the brake pedal is quickly depressed in the inoperative condition shown in FIG. 10, the valve plunger 114 will be driven forward through a stroke which is greater than the stroke occurring during the normal brake operation relative to the valve body 103 and the sleeve 137 before a brake reaction from the output shaft 112 occurs.

Accordingly, the first seat area S1 of the valve element 121 becomes seated upon the vacuum valve seat 116 to close the vacuum valve 122 while the atmosphere valve seat 117 is removed from the second seat area S2 of the valve element 121 to open the atmosphere valve 123. This allows the atmosphere to be introduced into the variable pressure chamber B, whereby the valve body 103 and the sleeve 137 are driven forward to actuate the brake booster 101.

Figure 12:
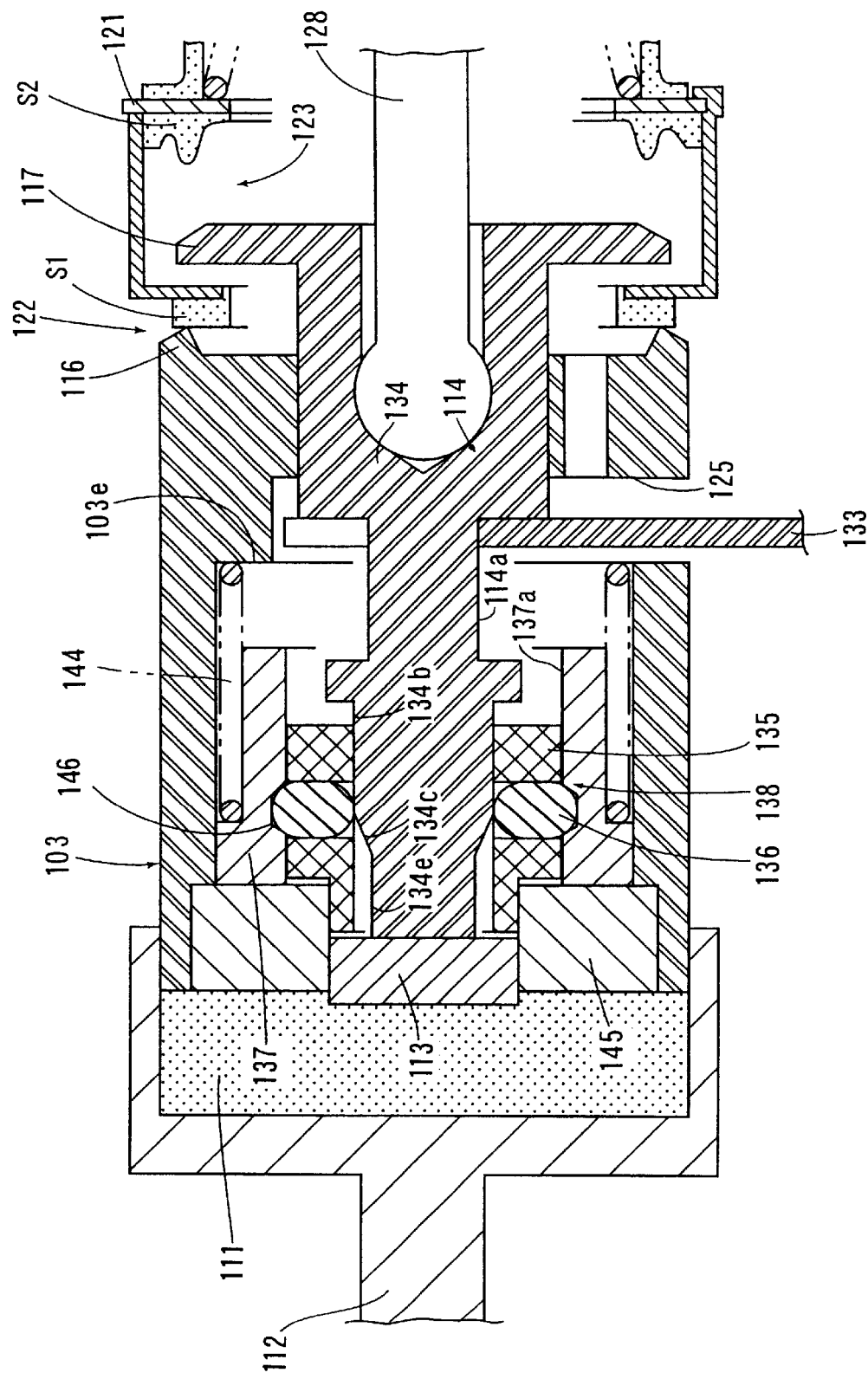
FIG. 12 is a cross section showing another operational phase during an emergency braking operation of the part shown in FIG. 10.

At this time, as the detent member 136 which abuts against the tapered portion 134c of the body 134 moves to a point inside the recess 146 while maintaining its abutment against the inner peripheral surface 137a of the sleeve 137, the detent member 136 which has been urged radially outward by the tapered portion 134c will have its radially outer portion received within the recess 146 and move radially outward. In this manner, the body 134 moves forward relative to the engaging member 135. In other words, the engaging member 135 assumes a retracted position which is retracted relative to the body 134, thus reducing the axial size of the entire valve plunger 114 (FIG. 12).

Because the axial size of the entire valve plunger 114 is reduced as compared with its axial size during the normal brake operation, the opening to which the atmosphere valve 123 is opened (or the separation between the atmosphere valve seat 117 and the second seat area S2) increases. Accordingly, the atmosphere is rapidly introduced into the variable pressure chamber B through the atmosphere valve 123 having an increased opening, thus allowing the output from the brake booster 101 to rise rapidly (FIG. 12).

A reaction from this output causes the reaction disc 111 to bulge rearward, urging the plunger plate 113 rearward, and the plate plunger 113 then urges the body 134 and the engaging member 135 rearward.

Figure 13:
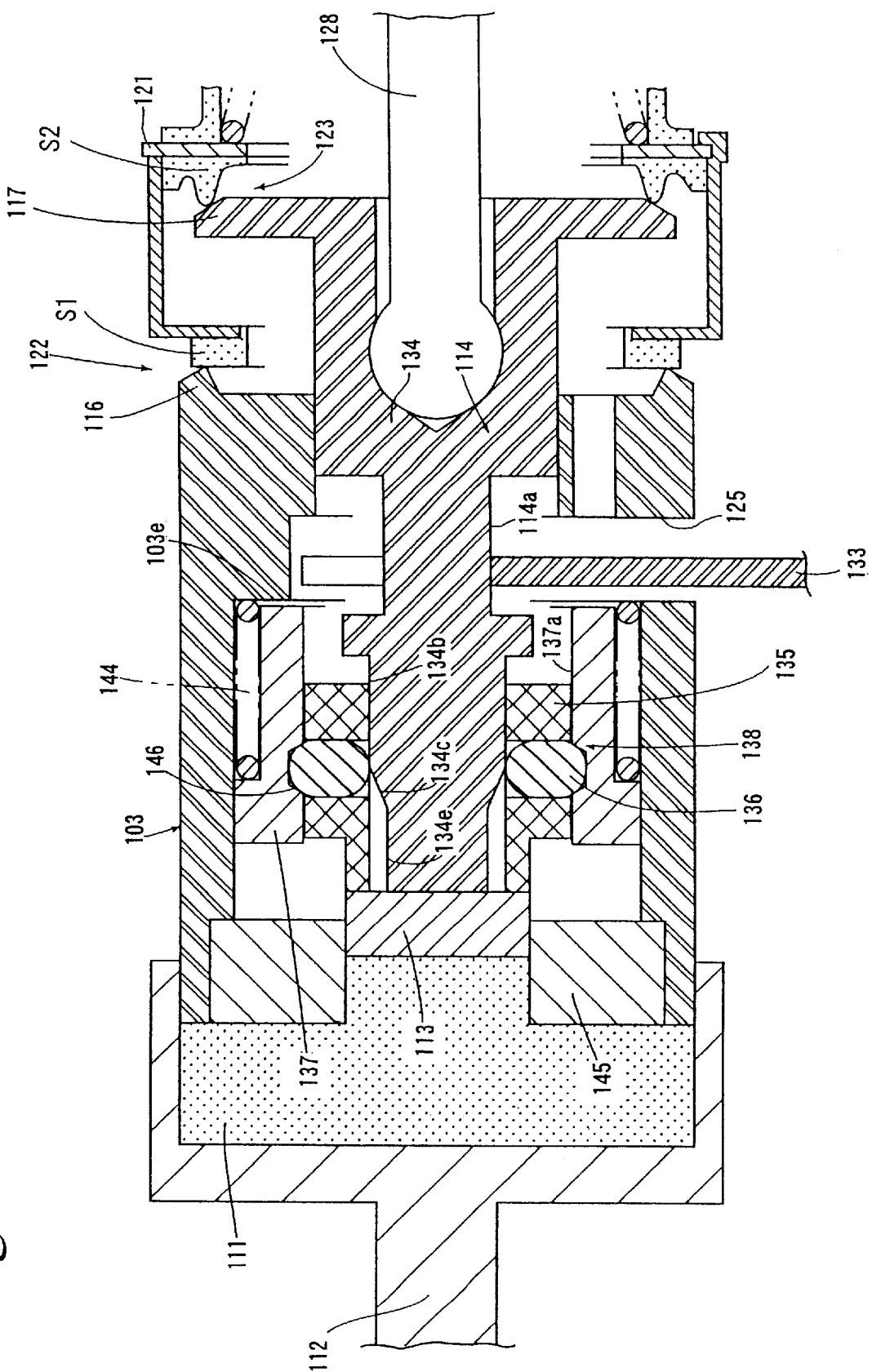
FIG. 13 is a cross showing a further operational phase during the emergency braking operation of the part shown in FIG. 10.

As a consequence, the body 134 assumes a servo balanced condition which is attained by having the atmosphere valve seat 117 seated upon the second seat area S2 of the valve element 121 to close the atmosphere valve 123. At this time, because the radially outer portion of the detent member 136 is accommodated in the recess 146 formed in the sleeve 137, the engaging member 135 retracts rearward, together with the sleeve 137, by an amount corresponding to the bulge of the reaction disc 111 while flexing the spring 144, thus reaching the servo balanced condition shown in FIG. 13.

In the servo balanced condition, the axial size of the entire valve plunger 114 is reduced as mentioned above, and accordingly, the amount by which the reaction disc 111 bulges increases as compared with the bulge achieved during the normal brake operation, thus allowing the output from the brake booster 101 to be increased by a corresponding amount. In this manner, an output of an increased magnitude can be rapidly obtained from the brake booster 101 in immediate response to a quick depression of the brake pedal.

Release

When the brake pedal is released during the emergency brake operation (or the servo balanced condition shown in FIG. 13), the valve plunger 114 and the input shaft 128 retract, and the atmosphere valve seat 123 remains closed while the vacuum valve seat 116 is removed from the first seat area S1 of the valve element 121 to open the vacuum valve 122. This causes the atmosphere to be displaced from the variable pressure chamber B into the constant pressure chamber A, and the valve body 103 and the power piston 105 retract toward their inoperative positions.

Figure 14:
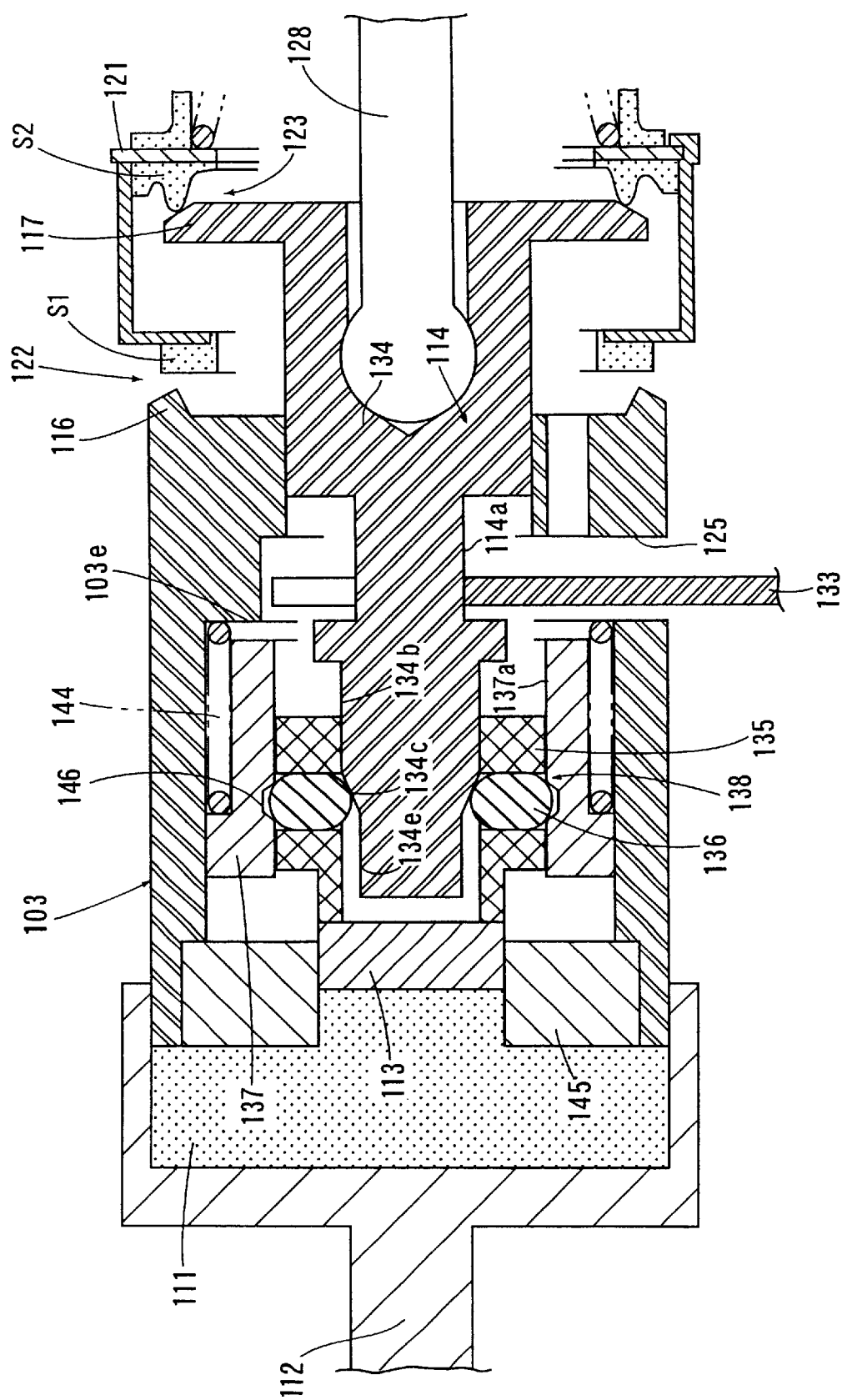
FIG. 14 is a cross section showing still another operational phase during the emergency braking operation of the part shown in FIG. 10.

The input shaft 128 and the body 134 then retract rearward relative to the valve body 103. When a position is reached where the tapered portion 134c of the body 134 is engageable with the detent member 136, the detent member 136 is urged out of the recess 146 in the sleeve 137 which is urged forwardly under the resilience of the spring 144 and moves radially inward to assume a condition shown in FIG. 14.

As the body 134 retracts and the detent member 136 is located on the smaller diameter portion 134e of the body 134, the radially outer portion of the detent member 136 is disengaged from the recess 146 in the sleeve 137, whereupon the sleeve 137 moves forward to abut against the reaction disc abutment member 145 under the resilience of the spring 144. The key member 133 abuts against the wall 102c of the shell 102 to stop its movement, and subsequently the valve plunger 114, which continues to retract rearward, stops its retracting movement at a position where the front end face of the engaging portion 114a abuts against the key member 133. The valve body 103 stops its retracting movement at a position where the front end face of the variable pressure passage 125 abuts against the key member 133. In this manner, the valve plunger 114 and the input shaft 128 return to their inoperative positions, and the engaging member 135 returns to its projecting position. Immediately thereafter, the front end face of the variable pressure passage 125 abuts against the key member 133, and the valve body 103 also comes to a stop upon returning to its inoperative position shown in FIG. 10.

As described, according to the second embodiment, there can be provided a brake booster 101 which allows its output to be rapidly increased during the emergency brake operation, using a simple construction including the provision of the length adjusting means 138 on the front portion of the valve plunger 114 and an improvement of associated parts, in the similar manner as described above in connection with the first embodiment. The simple construction improves the reliability of the brake booster 101 during the emergency brake operation.

While the invention has been described above in connection with several embodiments thereof, it should be understood that a number of changes, modifications and substitutions therein are possible from the above disclosure without departing from the spirit and scope of the invention defined by the appended claims.

What is claimed is:

1. A brake booster including a valve body slidably disposed in a shell, a power piston mounted on the valve body, a constant pressure chamber disposed forwardly of the power piston within the shell, a variable pressure chamber disposed rearwardly of the power piston within the shell, and a valve mechanism for switchably controlling a supply/discharge of a fluid to and from the variable pressure chamber, the valve mechanism including a vacuum valve seat formed on the valve body, a valve plunger connected to an input shaft and disposed within the valve body so as to be axially movable and having an atmosphere valve seat formed on a rear portion thereof, and a valve element including a first seat area which is adapted to be seated on the vacuum valve seat and a second seat area which is adapted to be seated on the atmosphere valve seat;

the brake booster further comprising length adjusting means for reducing the axial size of the valve plunger when the input shaft has been driven through a given stroke relative to the valve body and for increasing the relative moving distance between the valve body and the input shaft so as to increase an opening of the atmosphere valve provided between the atmosphere valve seat and the second seat area during an emergency braking operation.

2. A brake booster according to claim 1 in which the valve plunger comprises a rearwardly disposed body, said length adjusting means being provided on a front portion of the body;

the length adjusting means including an engaging member mounted on a front end of the body so as to be axially movable relative to the body, the length adjusting means maintaining the engaging member in a projecting position in which it projects forwardly of the body in an inoperative condition in which the input shaft is not driven forward, while permitting the engaging member to move to its retracted position in which it retracts rearward of the projecting position relative to the body when the input shaft is driven forward through a given stroke relative to the valve body.

3. A brake booster according to claim 2 in which the length adjusting means includes a sleeve mounted so as to surround the engaging member, the inner periphery of the valve body being formed with a step against which a front end of the sleeve can abut, the sleeve being loosely fitted into the inner periphery of the valve body at a location rearward of the step, the arrangement being such that as the input shaft is driven forward through a given stroke relative to the valve body, the front end of the sleeve abuts against the step on the valve body to switch the engaging member from its projecting position to its retracted position.

4. A brake booster according to claim 3, further comprising a key member which abuts against an internal surface of the shell in the inoperative condition of the booster to define a retracting end of the valve plunger relative to the valve body, the rear end of the sleeve abutting against the key member in the inoperative condition to maintain the engaging member in its projecting position.

5. A brake booster according to claim 2 in which the length adjusting means further comprises a detent member mounted on the engaging member so as to be radially movable, and a sleeve mounted around the detent member so as to be axially movable relative to the engaging member, the arrangement being such that as the input shaft is driven forward through a given stroke relative to the valve body, a radially outer portion of the detent member is accommodated in a recess formed in the inner peripheral surface of the sleeve to switch the engaging member form the projecting position to the retracted position.

6. A brake booster according to claim 5, further comprising a key member which abuts against an internal surface of the shell in the inoperative condition of the booster to define a retracting end of the valve plunger relative to the valve body, and a spring disposed between the sleeve and the valve body for maintaining the sleeve at an inoperative position relative to the valve body, thus maintaining the engaging member in its projecting position.

* * * * *